(12) United States Patent
Park et al.

(10) Patent No.: US 6,982,779 B2
(45) Date of Patent: Jan. 3, 2006

(54) LIQUID CRYSTAL DISPLAY PANEL AND FABRICATING METHOD THEREOF

(75) Inventors: Dae-Lim Park, Kyoungsangbuk-Do (KR); Seong-Soo Hwang, Gyoungsangbuk-Do (KR); Young-Sik Kim, Kyoungsangbuk-Do (KR); Su-Hwan Moon, Gyoungsangbuk-Do (KR)

(73) Assignee: LG.Philips LCD Co., Ltd., (KR)

( * ) Notice: Subject to any disclaimer, the term of this patent is extended or adjusted under 35 U.S.C. 154(b) by 142 days.

(21) Appl. No.: 10/669,014

(22) Filed: Sep. 24, 2003

(65) Prior Publication Data

US 2004/0125315 A1    Jul. 1, 2004

(30) Foreign Application Priority Data

Dec. 31, 2002    (KR) ..................... 10-2002-0088460

(51) Int. Cl.
*G02F 1/1339*    (2006.01)
(52) U.S. Cl. ...................... 349/153; 349/190
(58) Field of Classification Search ............... 349/153, 349/190
See application file for complete search history.

(56) References Cited

U.S. PATENT DOCUMENTS 6,424,401 B1 *    7/2002    Kang et al. ................. 349/153

* cited by examiner

*Primary Examiner*—James A. Dudek
(74) *Attorney, Agent, or Firm*—Morgan Lewis & Bockius LLP

(57) ABSTRACT

A liquid crystal display panel includes a first substrate, a second substrate, and a seal pattern. The first substrate has an image display portion thereon, and the seal pattern is along an outer periphery of the image display portion to attach the first substrate with the second substrate. The first substrate includes at least one conductive line disposed at a corner portion of the first substrate, a multi-layer film disposed on the first substrate and the at least one conductive line, and a transparent electrode formed on the multi-layer film and in the bonding holes. The multi-layer film defines a plurality of bonding holes disposed along a region where the seal pattern is disposed. Herein, the transparent electrode is entirely disposed within a boundary defined by an outer side of the seal pattern.

23 Claims, 5 Drawing Sheets

LIQUID CRYSTAL DISPLAY PANEL AND FABRICATING METHOD THEREOF

This application claims the benefit of the Korean Application No. P2002-088460 filed on Dec. 31, 2002, which is hereby incorporated by reference.

BACKGROUND OF THE INVENTION

1. Field of the Invention

The present invention relates to a liquid crystal display panel and a fabrication method thereof, and more particularly, to a liquid crystal display panel and a fabrication method thereof to prevent electrolytic corrosion between a pixel electrode formed on a thin film transistor array substrate and a conductive black matrix formed on a color filter substrate at a region where line-on-glass (LOG) type lines are formed on a liquid crystal display panel.

2. Discussion of the Related Art

In general, a liquid crystal display device displays images by individually supplying data signals to liquid crystal cells arranged in a matrix configuration and controlling light transmittance of the liquid crystal cells. Accordingly, the liquid crystal display device includes a liquid crystal display panel on which liquid crystal cells are arranged in the matrix configuration and a driving circuit to drive the liquid crystal cells.

The liquid crystal display panel includes a color filter substrate and a thin film transistor array substrate attached to each other with a certain gap therebetween, and a liquid crystal material layer formed within the gap between the color filter substrate and the thin film transistor array substrate. On the thin film transistor array substrate of the liquid crystal display panel, a plurality of data lines for transmitting image information to the liquid crystal cells and a plurality of gate lines for transmitting scan signals to the liquid crystal cells intersect, and liquid crystal cells are defined at every intersection of the data lines and the gate lines.

A common electrode and a pixel electrode are formed facing inner surfaces of the color filter substrate and the thin film transistor array substrate to supply an electric field to the liquid crystal material layer. Here, the pixel electrode is formed at every liquid crystal cell of the thin film transistor array substrate while the common electrode is integrally formed at an entire surface of the color filter substrate. Accordingly, by controlling first voltages supplied to the pixel electrode when the common electrode receives a second voltage, light transmittance of the liquid crystal cells can be individually controlled. To control the voltages supplied to the pixel electrode of each liquid crystal cell, each liquid crystal cell includes a thin film transistor as a switching device.

The driving circuit includes a gate driving unit to supply a scan signal to the gate lines, a data driving unit to supply image information to the data lines, a timing controller to control a driving timing of the gate driving unit and the data driving unit, and a power supply unit to supply various driving voltages used for a liquid crystal display device. The timing controller controls a driving timing of the gate driving unit and the data driving unit through image information and a control signal supplied from an external graphic processor, and supplies image information to the data driving unit.

The power supply unit generates driving voltages, such as a common voltage (Vcom), a gate high voltage (Vgh), a gate low voltage (Vgl) or a gamma reference voltage (Vref) used for the liquid crystal display device by using power supplied from the external graphic processor. The power supply unit also supplies them to the gate driving unit, the data driving unit, a gamma voltage generator, and the liquid crystal display panel.

The gate driving unit sequentially supplies a scan signal to the gate lines so that the liquid crystal cells arranged in the matrix configuration can be selected line-by-line, and image information is supplied to the liquid crystal cells of the selected one line from the data driving unit by way of the data lines.

When the image information is individually supplied to the pixel electrode of the liquid crystal cells and the common voltage (Vcom) is supplied to the common electrode, a voltage difference occurs between the pixel electrode and the common electrode, according to which an electric field is supplied to the liquid crystal material layer. Thus, the light transmittance of the liquid crystal cells are individually controlled to display a desired image.

The data driving unit and the gate driving unit, which are directly connected to the liquid crystal display panel, are fabricated with a plurality of integrated circuits (IC). The data driving integrated circuits and the gate driving integrated circuits are mounted on a tape carrier package (TCP) and are connected to the liquid crystal display panel in a tape automated bonding (TAB) method. When the data driving integrated circuits are connected to the liquid crystal display panel in the TAB method through the tape carrier package, the tape carrier package is connected to a data printed circuit board (PCB), image information, control signals, and driving voltages are supplied from the timing controller and the power supply unit through the lines mounted on the data printed circuit board. When the gate driving integrated circuits are connected to the liquid crystal display panel in the TAB method through the tape carrier package, the tape carrier package is connected to the gate printed circuit board, control signals and driving voltages are supplied from the timing controller and the power supply unit through the lines mounted on the gate printed circuit board.

Currently, as the semiconductor process techniques and packaging techniques advance, a highly integrated and high performance semiconductor chip is required. Accordingly, a controller, which has been mounted on the gate printed circuit board, can be mounted on the data printed circuit board, making one chip perform as a highly integrated, high performance semiconductor chip. As a result, the gate printed circuit board simply functions to transmit signals processed in the data printed circuit board.

Figure 1:
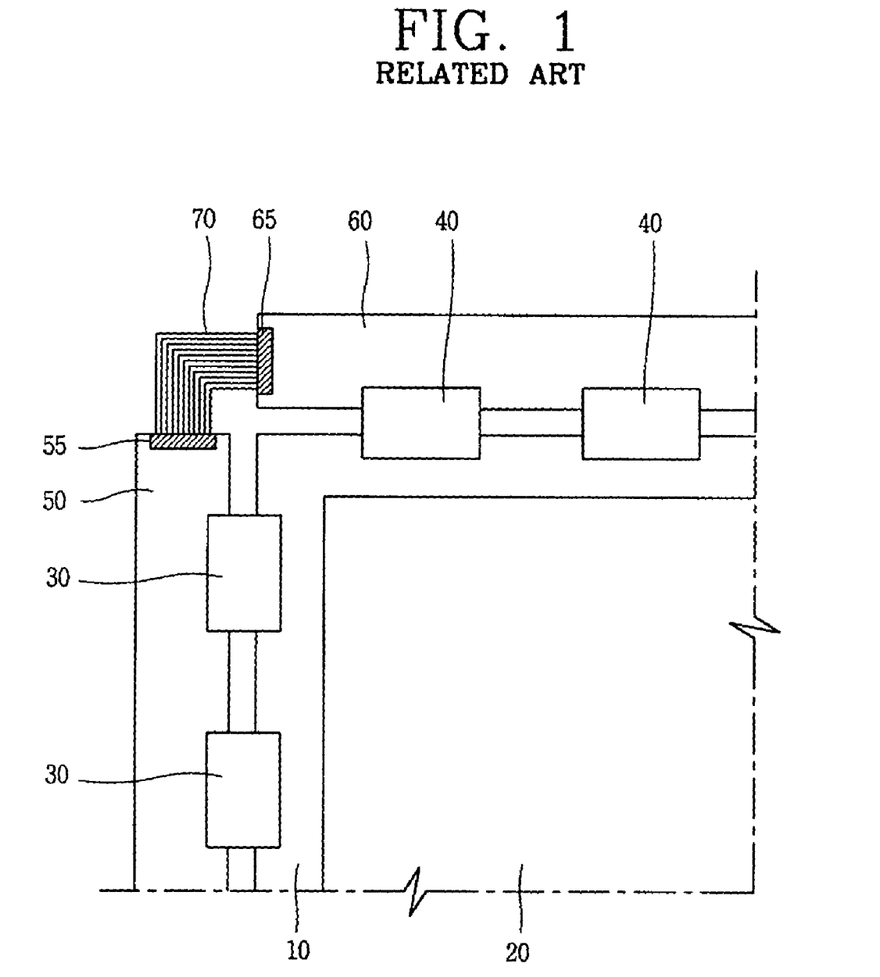
FIG. 1 shows a liquid crystal display panel and a connection state of a related driving unit.

FIG. 1 is a partial plan view of a liquid crystal display panel and a connection state of a driving unit according to the related art. In FIG. 1, the liquid crystal display panel includes a thin film transistor array substrate 10 and a color filter substrate 20 attached to face each other, a gate tape carrier package 30 connected to a gate pad portion of the thin film transistor array substrate 10, a data tape carrier package 40 connected to a data pad portion of the thin film transistor array substrate 10, a gate printed circuit board 50 connected to the gate tape carrier package 30, and a data printed circuit board 60 connected to the data tape carrier package 40.

The data printed circuit board 60 includes a controller (not shown) to process image information, control signals, and driving voltages. The controller is highly integrated and has high performance to process control signals and driving voltages to be supplied to the gate printed circuit board 50. Accordingly, the gate printed circuit board 50 has a simple function of transmitting the control signals and the driving voltages supplied from the data printed circuit board 60 to the gate pad portion of the thin film transistor array substrate 10 through the gate tape carrier package 30.

To supply the control signals and the driving voltages from the data printed circuit board 60 to the gate printed circuit board 50, connectors 55 and 65 are formed at the gate printed circuit board 50 and the data printed circuit board 60. The connectors 55 and 65 formed at the gate printed circuit board 50 and the data printed circuit board 60 are electrically connected by a flexible plate cable (FPC) 70.

However, the liquid crystal display device has the following disadvantages. First, since the connectors 55 and 65 are formed on the thin gate printed circuit board 50 and the thin data printed circuit board 60, a thickness of the liquid crystal display device becomes as high as the thickness of the connectors 55 and 65, thereby impeding obtaining of a thin liquid crystal display device. Second, to electrically connect the connectors 55 and 65, the flexible plate cable 70 should be installed, which increases the number of processes for fabrication of a liquid crystal display device as well as its production cost. Thus, a liquid crystal display device of a line-on-glass method has been proposed in which lines to supply control signals and driving voltages from the data printed circuit board 60 to the gate printed circuit board 50 are mounted at an outer dummy region of the thin film transistor array substrate 10.

Figure 2:
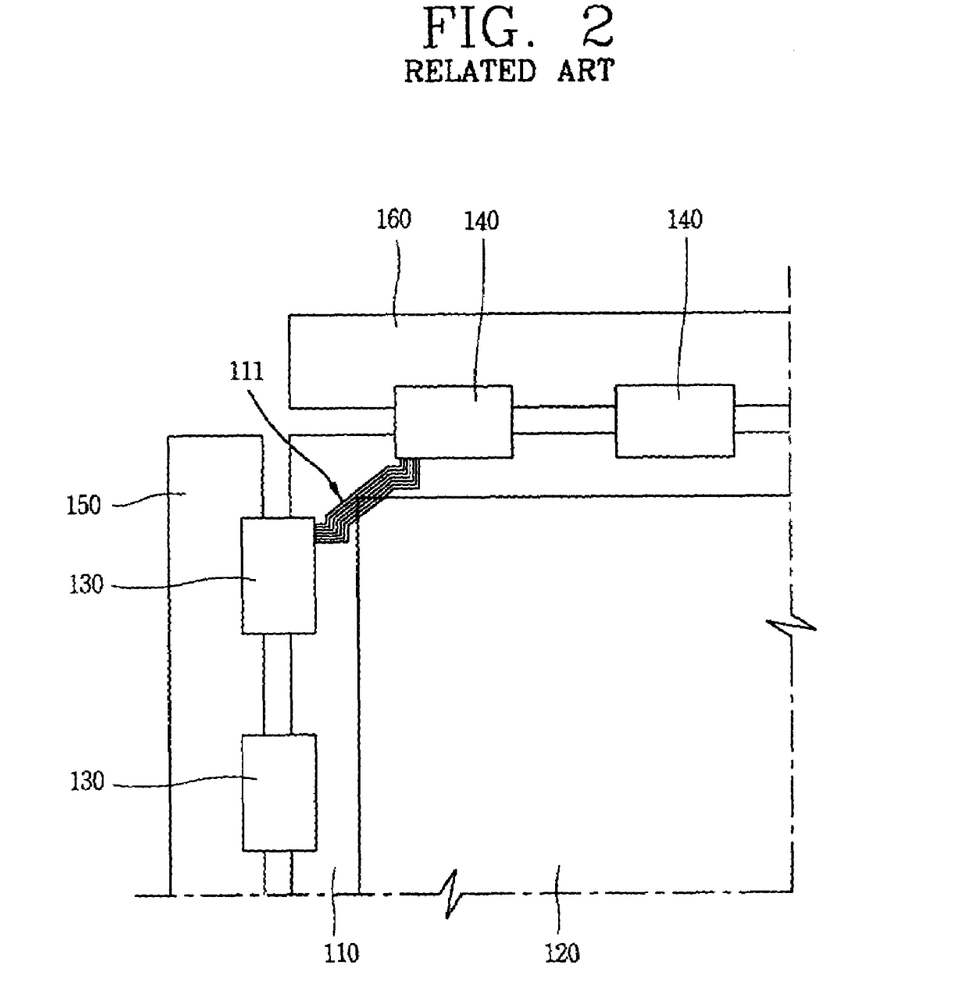
FIG. 2 shows the liquid crystal display panel of the line-on-glass method and a connection state of a related art driving unit.

FIG. 2 is a partial plan view of a liquid crystal display panel using a line-on-glass method and a connection state of a driving unit according to the related art. In FIG. 2, a liquid crystal display panel of a line-on-glass method includes a thin film transistor array substrate 110 and a color filter substrate 120 attached to face each other, a gate tape carrier package 130 connected to a gate pad portion of the thin film transistor array substrate 110, a data tape carrier package 140 connected to a data pad portion of the thin film transistor array substrate 110, a gate printed circuit board 150 connected to the gate tape carrier package 130, and a data printed circuit board 160 connected to the data tape carrier package 140.

The data printed circuit board 160 includes a controller to process image information, control signals, and driving voltages. The controller is highly integrated to process control signals and driving voltages to be supplied to the gate printed circuit board 150. Accordingly, the gate printed circuit board 150 has a simple function of transmitting the control signals and the driving voltages supplied from the data printed circuit board 160 to the gate pad portion of the thin film transistor array substrate 110 through the gate tape carrier package 130. In general, the liquid crystal display panel is constructed such that the thin film transistor array substrate 110 and the color filter substrate 120 are attached with a certain gap therebetween in a facing manner, and a liquid crystal material layer is formed in the gap.

One shorter side and one longer side of the thin film transistor array substrate 110 protrude compared to the color filter substrate 120, and a gate pad portion electrically connects to the gate lines of the thin film transistor array substrate 110 and a data pad portion electrically connects to the data lines of the thin film transistor array substrate 110 are formed at the protruded region.

The gate pad portion and the data pad portion are formed corresponding to an effective image display portion of the attached thin film transistor array substrate 110 and the color filter substrate 120. Accordingly, the corner portion where one shorter side and one longer side of the thin film transistor array substrate 110 meet is a dummy region and provides no real purpose for the liquid crystal display panel.

However, in the liquid crystal display panel of the line-on-glass method using the dummy region, line-on-glass lines 111 are mounted on the corner portion where one shorter side and one longer side of the thin film transistor array substrate 110 meet to supply control signals and driving voltages from the data printed circuit board 160 to the gate printed circuit board 150. Thus; the connectors 55 and 65 of FIG. 1 do not need to be formed on the gate printed circuit board 150 and the data printed circuit board 160, wherein the flexible plate cable 70 of FIG. 1 to electrically connect the connectors 55 and 65 is not required.

Driving voltages supplied to the gate printed circuit board 150 through the line-on-glass lines 111 include DC signals, such as a gate high voltage (Vgh), a gate low voltage (Vgl), a common voltage (Vcom), a ground voltage (GND), and a power supply voltage (Vcc). Similarly, control signals supplied to the gate printed circuit board 150 through the line-on-glass lines 111 include AC signals, such as a gate start pulse (GSP), a gate shift clock (GSC), and a gate enable signal (GOE). Usually, the line-on-glass lines 111 are simultaneously patterned and formed during the process of forming gate lines and gate electrodes on the thin film transistor array substrate 110.

Figure 3:
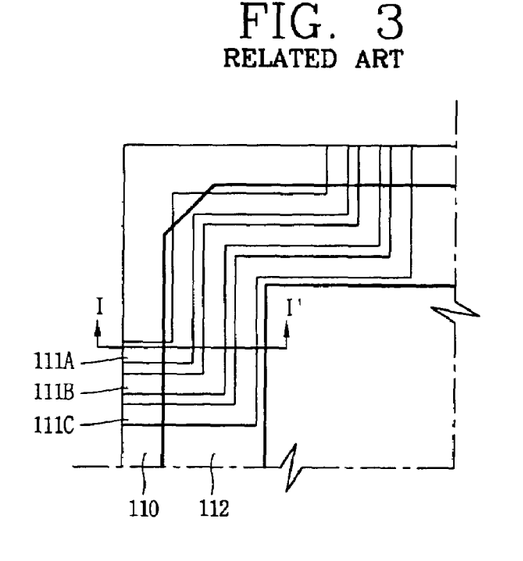
FIG. 3 is an enlarged view showing a region shown in FIG. 2 where the line-on-glass lines are formed.

FIG. 3 is a partial plan view of an enlarged region where line-on-glass lines are formed on the thin film transistor array substrate of FIG. 2 according to the related art. In FIG. 3, line-on-glass lines 111A~111C are formed regularly spaced apart at the corner portion where one shorter side and one longer side of the thin film transistor array substrate 10 meet. The line-on-glass lines 111A~111C are simultaneously patterned and formed during the process of forming the gate lines and the gate electrodes on the thin film transistor array substrate 110. In addition, a seal pattern 112 is formed at the region of the thin film transistor array substrate 110 where the line-on-glass lines 111A~111C are formed. The seal pattern 112 is formed along an outer edge of an image display region of the liquid crystal display panel to attach the thin film transistor array substrate 110 and a color filter substrate (i.e., 120 in FIG. 2).

Figure 4:
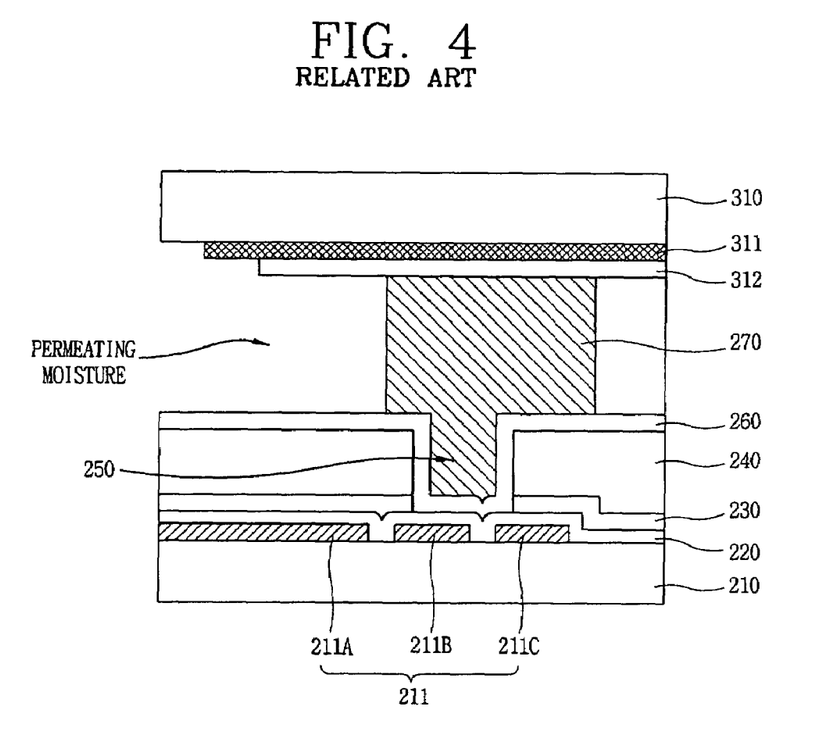
FIG. 4 is an exemplary view showing a section taken along line I–I' of FIG. 3.

FIG. 4 is an cross sectional view along I–I' of FIG. 3 according to the related art. The liquid crystal display panel of the line-on-glass method and its fabrication method will now be described in detail with reference to FIG. 4.

First, line-on-glass lines 211 are patterned regularly spaced apart at an upper surface of a thin film transistor array substrate 210, wherein the line-on-glass lines 211 are simultaneously patterned and formed during the process of forming gate lines and gate electrodes on the thin film transistor array substrate 210. A gate insulation film 220 and an active layer 230 are sequentially formed at the upper surface of the thin film transistor array substrate 210 with the line-on-glass lines 211 patterned regularly spaced apart thereon. The gate insulation film 220 and the active layer 230 are sequentially formed to form a thin film transistor at an image display portion of the thin film transistor array substrate 210, and though not shown on the drawing, on the image display portion, the active layer 230 is patterned and then data lines and source/drain electrodes of the thin film transistor are simultaneously patterned.

At a portion of the active layer 230 where the thin film transistor of the image display portion is formed, a semiconductor layer made of amorphous silicon and an ohmic contact layer made of n+ amorphous silicon doped with phosphorus (P) at a high concentration are consecutively deposited and patterned. Then, when the data lines and the source/drain electrodes are patterned, the exposed ohmic contact layer is removed to work as a channel of the thin film transistor. Accordingly, the ohmic contact layer is removed at the region other than the lower portions of the data lines and the source/drain electrodes, thereby leaving only the semiconductor layer.

A passivation film 240 is formed at an upper surface of the active layer 230, and is made of an inorganic material as a thin film, such as SiNx or SiOx. However, to improve an aperture ratio of the liquid crystal display device, an organic material, such as benzocyclobutene (BCB), a spin-on-glass (SOG) or photo-acryl, is applied as a thick film.

The passivation film 240 is selectively etched to form a drain contact hole exposing a portion of the drain electrode, and the exposed drain electrode electrically contacts a pixel electrode provided in a unit pixel through the drain contact hole. Since the organic material, such as benzocyclobutene (BCB), a spin-on-glass (SOG) or photo-acryl, is used for the passivation film 240, a dry etching is performed to form the drain contact hole.

The passivation film 240 is made of an organic material and does not have good bonding characteristics as a thick film with respect to a seal pattern which will be formed in a follow-up process. Morevoer, the attached thin film transistor array substrate 210 and the color filter substrate 310 may crack or moisture may permeate into the image display portion, thereby causing defects in the liquid crystal display panel. Thus, to improve the adhesive force with respect to a seal pattern 270, when the drain contact hole is formed, the passivation film 240 at the region where the line-on-glass lines 211 are formed is simultaneously dry-etched to form a plurality of bonding holes 250. Accordingly, the active layer 230 formed at the lower side of the passivation film 240 is also etched as being affected by the dry-etching of the passivation film 240, thereby exposing the gate insulation film 220 at the bottom surface of the bonding holes 250.

A pixel electrode 260 overlapping with the line-on-glass lines 211 is patterned at an upper portion of a resulting structure where the gate insulation film 220, the passivation film 240 and the bonding holes 250 have been formed. The pixel electrode 260 is provided in the unit pixel at the region where the thin film transistor of the image display portion is formed, and patterned by wet-etching to electrically contact the drain electrode through the drain contact hole formed at the passivation film 240 and patterned to overlap with the line-on-glass lines 211 at the region where the line-on-glass lines 211 are formed.

The reason of patterning the pixel electrode 260 to overlap with the line-on-glass lines 211 is as follows. If the dry-etching is excessively performed in forming the bonding holes 250 at the passivation film 240, the gate insulation film 220 exposed at the bottom surface of the bonding holes 250 would be also etched by being affected by the dry-etching of the passivation film 240, and accordingly, the line-on-glass lines 211 formed at the lower side of the gate insulation film 220 at the bottom surface of the bonding holes 250 would be exposed. In this state, if the pixel electrode 260 is removed through wet-etching at the region where the line-on-glass lines 211 have been formed, the line-on-glass lines 211 exposed through the bonding holes 250 would be also etched during the wet-etching of the pixel electrode 260. When the line-on-glass lines 211 are partially etched and damaged, characteristics of electrical signals transmitted through the line-on-glass lines 211 would be changed, and in a worst case, the line-on-glass lines 211 are open, thereby causing a driving deficiency or a degradation of a picture quality of a liquid crystal display device.

Therefore, to prevent such problems, the pixel electrode 260 is widely patterned overlapping with the line-on-glass lines 211. As stated above, when the pixel electrode 260 is widely patterned overlapping with the line-on-glass lines 211, the pixel electrode 260 and the line-on-glass line 211 may electrically contact. That is, if a dry-etching to form the bonding holes 250 at the passivation film 240 is performed excessively, the gate insulation film 220 exposed at the bottom surface of the bonding holes 250 is also etched due to influence of the dry-etching on the passivation film 240, thereby resulting in the line-on-glass line 211 being exposed at the bottom surface of the bonding holes 250 and electrically contacting the pixel electrode 260.

Meanwhile, a black matrix 311 is coated at an upper surface of the color filter substrate 310, on which red (R), green (G) and blue (B) color filters (not shown) are formed corresponding to the unit pixel of the image display portion, and a common electrode 312 is formed at the entire upper surface of the color filter substrate 310 including the black matrix 311 and the color filter. At this time, the black matrix 311 is formed at regions corresponding to gate lines, data lines and thin film transistors formed at the image display portion of the thin film transistor array substrate 210 to prevent a phenomenon that red, green and blue lights transmitted by unit pixels through the color filters are mixed with adjacent pixels to degrade of picture quality of the liquid crystal display panel.

As the black matrix 311, a black resin or a Cr material may be applied. The Cr material is more advantageous in the aspect of making a thin film and a material cost compared to the black resin, and in addition, because the Cr material can be precisely patterned at a desired position, it is generally used.

The thin film transistor array substrate 210 and the color filter substrate 310 are attached by the seal pattern 270 so that the pixel electrode 260 and the common electrode 312 face each other. At this time, the black matrix 311 and the common electrode 312 formed on the color filter substrate 310 are extended to a predetermined distance outwardly of the seal pattern 270, and the black matrix 311 is more extended than the common electrode 312. Accordingly, at the region where the line-on-glass lines 211 (including 211A, 211B and 211C) are formed, the pixel electrode 260 faces the black matrix 311 and the common electrode 312 extended outwardly of the seal pattern 270.

The seal pattern 270 covers the image display portion to prevent infiltration of moisture or a contaminant from outside. Meanwhile, the outer edge of the seal pattern 270, that is, the region where the line-on-glass lines 211 of the liquid crystal display panel are formed is not prevented from infiltration of moisture or a contaminant. If moisture or contamination infiltrates into the region where the line-on-glass lines 211 are formed, electrolytic corrosion occurs between the facing pixel electrode 260 and the black matrix 311 made of Cr.

In other words, when the pixel electrode 260 is widely patterned overlapping with the line-on-glass lines 211, the pixel electrode 260 and the line-on-glass lines 211 contact electrically each other so that a gate low voltage (Vgl) of −5V transmitted through the line-on-glass lines 211 is applied to the pixel electrode 260. Meanwhile, the common electrode 312 to which a common voltage of 3V is applied contacts the black matrix 311 made of Cr, so the common voltage of 3V is applied to the black matrix 311.

Thus, if moisture or contamination infiltrates between the pixel electrode 260, to which −5V has been applied, and the black matrix 311, to which 3V has been applied, electrolyte corrosion occurs. Then, the Cr component of the black matrix 311 is ionized because of the electrolyte corrosion, and as the electrolyte of the black matrix 311 passes through the seal pattern 270 and proceeds to the image display portion, light is leaked from the image display portion of the liquid crystal display panel. In addition, because the Cr component of the black matrix 311 is ionized to cause a current flow, a short can occur between the line-on-glass lines 211 and the black matrix 311. Also, because the black matrix 311 is in contact electrically with the common electrode 312, an electric signal transmitted through the line-on-glass lines 211 and the common voltage applied to the common electrode 312 are affected by the short, thereby causing a deficiency in driving the liquid crystal display panel.

SUMMARY OF THE INVENTION

Accordingly, the present invention is directed to a liquid crystal display panel and a fabrication method thereof that substantially obviates one or more of the problems due to limitations and disadvantages of the related art.

An object of the present invention is to provide a liquid crystal display panel and a fabrication method thereof in which an electrolytic corrosion occurring between a pixel electrode formed on a thin film transistor array substrate and a conductive black matrix formed on a color filter substrate can be prevented at a region where line-on-glass (LOG) type lines are formed on a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display panel comprises a first substrate having an image display portion thereon; a second substrate; and a seal pattern disposed along an outer periphery of the image display portion to attach the first substrate with the second substrate, wherein the first substrate includes at least one conductive line disposed at a corner portion of the first substrate, a multi-layer film disposed on the first substrate and the at least one conductive line, the multi-layer film defining a plurality of bonding holes disposed along a region where the seal pattern is disposed, and a transparent electrode formed on the multi-layer film and in the bonding holes such that the transparent electrode is entirely disposed within a boundary defined by an outer side of the seal pattern.

In another aspect, a method for fabricating liquid crystal display panel comprises the steps of preparing a first substrate as a thin film transistor substrate; preparing a second substrate as a color filter substrate; forming at least one transparent electrode on at least one of the first substrate and the second substrate; and forming a seal pattern to attach the first substrate with the second substrate, wherein the transparent electrode is entirely disposed within a boundary defined by an outer side of the seal pattern.

In another aspect, a liquid crystal display panel comprises a first substrate; a second substrate; a seal pattern disposed along an outer edge of an image display portion of the first substrate and the second substrate, and attaching the first and second substrates; at least one line-on-glass line disposed at a corner portion of the first substrate; a multi-layer film disposed on the first substrate with the line-on-glass line formed thereon and having a plurality of bonding holes disposed regularly along the region where the seal pattern passes; and a transparent electrode disposed on the multi-layer film having a plurality of the bonding holes overlapping the line-on-glass line and patterned not to be protruded from the seal pattern.

In another aspect, a liquid crystal display panel comprises a first substrate having an image display portion thereon; a second substrate; and a seal pattern disposed along an outer periphery of the image display portion to attach the first substrate with the second substrate, wherein at least one of the first substrate and the second substrate includes a transparent electrode such that the transparent electrode is entirely disposed within a boundary defined by an outer side of the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
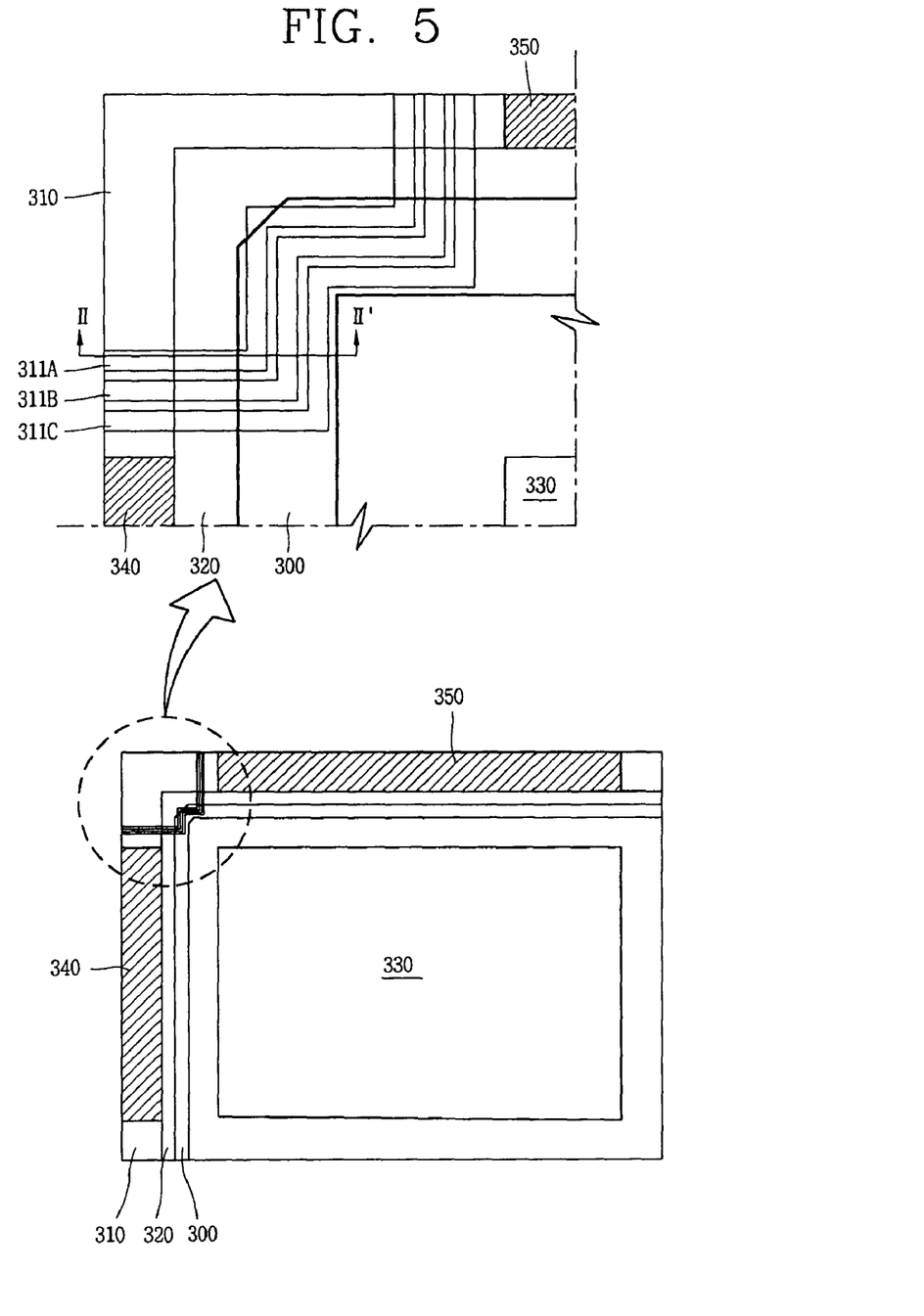
FIG. 5 is an exemplary view showing a liquid crystal display panel and its partial enlarged plane structure in accordance with an embodiment of the present invention.

FIG. 5 is partial plan view of an exemplary liquid crystal display panel according to the present invention. In FIG. 5, a first substrate 310 and a second substrate 320 may be attached together such that one shorter side and one longer side of the first substrate 310 may protrude, and an image display portion 330, upon which a plurality of pixels may be arranged in a matrix configuration, may be formed within the region where the first substrate 310 and the second substrate 320 are attached together. For example, the first substrate 310 may be a thin film transistor (TFT) array substrate of the liquid crystal display panel, and the second substrate 320 may be a color filter (CF) substrate.

Accordingly, on the image display portion 330 of the first substrate 310, a plurality of gate lines may be arranged along a horizontal direction at regular intervals, a plurality of data lines may be arranged along a vertical direction at regular intervals, and a plurality of pixels may be defined at every intersection of the gate lines and the data lines in a matrix configuration. In addition, each pixel may have a TFT as a switching device and a pixel electrode connected to the TFT. The thin film transistor may include a gate electrode that may be simultaneously patterned with the gate lines to be electrically connected to the gate lines, a source electrode that may be simultaneously patterned with the data lines to be electrically connected to the data lines, and a drain electrode that may be simultaneously patterned with the data lines and the source electrode to be electrically connected to the pixel electrode.

On the image display portion 330 of the second substrate 320, there are provided red, green, and blue color filters coated separately in each pixel defined by a black matrix, and a common electrode, which is a counter electrode of the pixel electrode, formed on the first substrate 310. The first substrate 310 and the second substrate 320 may be attached together by a seal pattern 300 formed along an outer edge of the image display portion 330. Accordingly, randomly scattered spacer balls may be provided or patterned spacers may be formed through photolithographic processes on the first substrate 310 or on the second substrate 320, thereby providing a certain space between the first substrate 310 and the second substrate 320 wherein a liquid crystal material layer is formed with the space.

At the protruded shorter side of the first substrate 310, a gate pad portion 340 may be formed at a region corresponding to the image display portion 330, and may be electrically connected to the gate lines for supplying driving signals to the gate lines. At the protruded longer side of the first substrate 310, a data pad portion 350 may be formed at a region corresponding to the image display portion 330, and may be electrically connected to the data lines for supplying image information to the data lines.

At the corner portion where the protruded shorter side and longer side of the first substrate 310 meet, line-on-glass lines 311A~311C may be mounted to transmit DC signals, such as a gate high voltage (Vgh), a gate low voltage (Vgl), a common voltage (Vcom), a ground voltage (GND) and a power supply voltage (Vcc), as well as AC signals, such as a gate start pulse (GSP), a gate shift clock (GSC), and a gate enable signal (GOE). The line-on-glass lines 311A~311C may be simultaneously patterned and formed while forming the gate lines and the gate electrodes on the first substrate 310.

A pixel electrode (not shown) may be patterned with at least an multi-layer intermediate film (not shown) interposed therebetween to overlap with the line-on-glass lines 311A~311C. Also, the pixel electrode may be patterned to not be protruded from the seal pattern 300.

Figure 6:
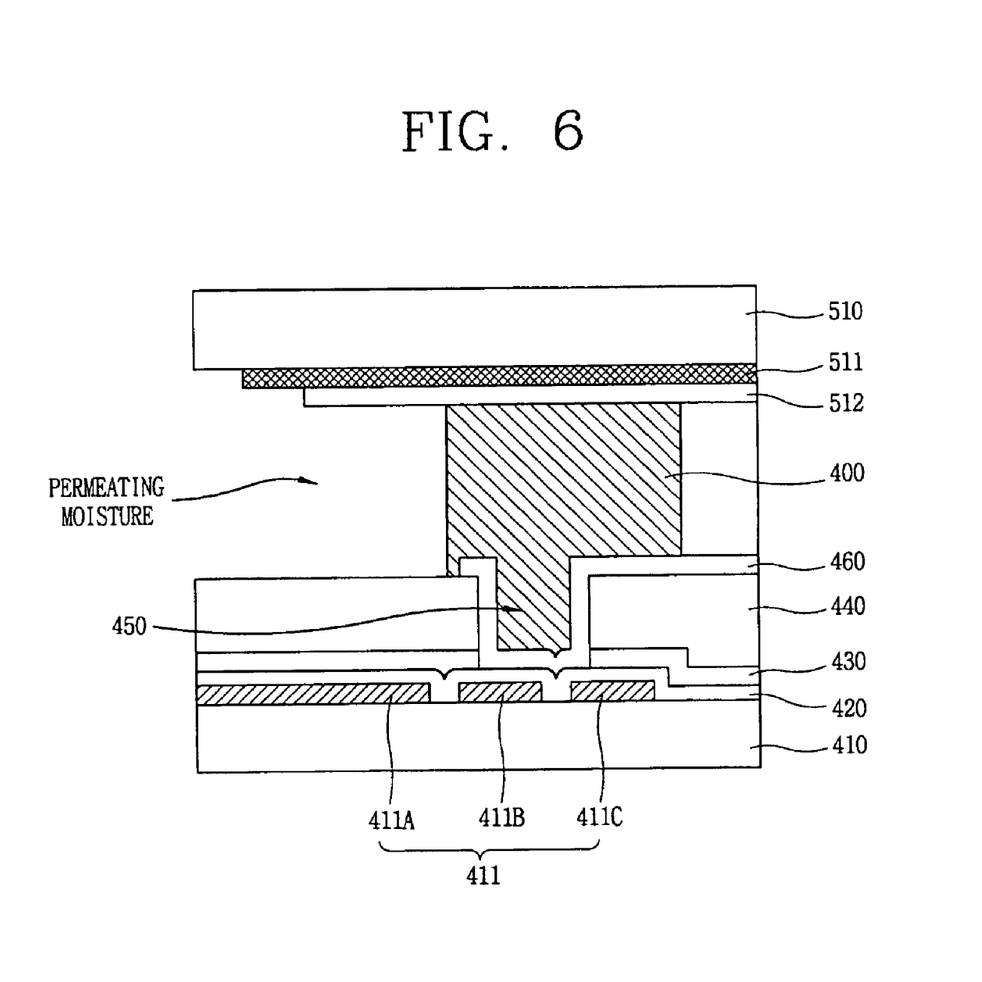
FIG. 6 is an exemplary view showing a section taken along line II–II' of FIG. 5.

FIG. 6 is a cross sectional view along II–II' of FIG. 5 according to the present invention. The liquid crystal display panel of the line-on-glass method and its fabrication method in accordance with the present invention will now be described. First, line-on-glass lines 411(411A, 411B, and 411C) may be patterned at regular intervals on the first substrate 410 wherein the line-on-glass lines 411 may be simultaneously patterned during the process of forming the gate lines and the gate electrodes at the image display portion of the first substrate 410.

Next, a gate insulation film 420 and an active layer 430 may be sequentially formed at an upper surface of the first substrate 410 with the line-on-glass lines 411 patterned at regular intervals thereon. The gate insulation film 420 and the active layer 430 may be sequentially formed to form a thin film transistor at the image display portion of the first substrate 410, and although not shown, on the image display portion, after the active layer 430 has been patterned, the data lines and the source/drain electrodes may be simultaneously patterned.

At a region of the active layer 430 where the thin film transistor of the image display portion is formed, a semiconductor layer made of amorphous silicon and an ohmic contact layer made of n+ amorphous silicon doped with phosphorus (P) at high concentration may be successively deposited and patterned. When the data lines and source/drain electrodes are patterned, the exposed ohmic contact layer may be removed to define a channel of the thin film transistor. Accordingly, as the ohmic contact layer is removed at the region other than the lower portions of the data lines and source/drain electrodes, only the semiconductor layer remains.

Then, a passivation film 440 may be formed on the active layer 430, wherein the passivation film 440 may include an organic material, such as benzocyclobutene (BCB), a spin-on-glass (SOG), or a photo-acryl with a low dielectric constant, by which an aperture ratio of the liquid crystal display device may be improved. The passivation film 440 may be selectively etched to form a drain contact hole exposing a portion of the drain electrode, and the drain electrode may electrically contact the pixel electrode provided at the unit pixel through the drain contact hole. Since the organic material, such as benzocyclobutene (BCB), a spin-on-glass (SOG), or a photo-acryl with a low dielectric constant, may be applied to form the passivation film 440, a dry-etching may be performed to form the drain contact hole.

The passivation film 440 having an organic material formed as a thick film may not have good bonding characteristics with respect to the seal pattern 400 to be formed in a follow-up process. Thus, the attached first substrate 410 and the second substrate 510 may crack or moisture may permeate into the image display portion, thereby causing defects in the liquid crystal display panel. To improve the adhesive force with respect to the seal pattern 400, when the drain contact hole is formed, the passivation film 440 at the region where the line-on-glass lines 411 are formed may be simultaneously dry-etched to form a bonding hole 450. Accordingly, the active layer 430 formed at the lower side of the passivation film 440 may also be etched as being affected by the dry-etching of the passivation film 440 so that the gate insulation film 420 is exposed at the bottom surface of the bonding hole 450.

The pixel electrode 460 is patterned at an upper portion of a resulting structure that the gate insulation film 420, the passivation film 440 and the bonding hole 450 have been formed to overlap with the line-on-glass lines 411. At this time, the pixel electrode 460 is patterned not to be protruded from the seal pattern 400. As stated above, the pixel electrode 460 is provided in the unit pixel at the region where the thin film transistor of the image display portion is formed and patterned by wet-etching to electrically contact the drain electrode through the drain contact hole formed at the passivation film 440. Further, at this time, the pixel electrode 460 is patterned to overlap with the line-on-glass lines 411 and to not be protruded from the seal pattern 400.

The reason of patterning the pixel electrode 460 to overlap with the line-on-glass lines 411 is as follows. If the dry-etching is excessively performed in forming the bonding hole 450 at the passivation film 440, the gate insulation film 420 exposed at the bottom surface of the bonding hole 450 would be also etched by the dry-etching of the passivation film 440. Accordingly, the line-on-glass lines 411 formed at the lower side of the gate insulation film 420 at the bottom surface of the bonding hole 450 would be exposed. If the pixel electrode 460 is removed through a wet-etching at the region where the line-on-glass lines 411 have been formed, the line-on-glass lines 411 exposed through the bonding hole 450 would be also etched by the wet-etching of the pixel electrodes 460.

When the line-on-glass lines 411 are partially etched and damaged, characteristics of electric signals transmitted through the line-on-glass lines 411 would be changed, and in a worst case, the line-on-glass lines 411 are open, thereby causing a driving deficiency or a degradation of a picture quality of a liquid crystal display device. Therefore, to prevent such problems, the pixel electrode 460 is patterned overlapping with the line-on-glass lines 411.

Meanwhile, a black matrix 511 is coated along an outer edge of pixels of the image display portion at an upper surface of the second substrate 510, on which red (R), green (G) and blue (B) color filters (not shown) are formed corresponding to the unit pixel of the image display part. A common electrode 512 is formed at the upper surface of the color filter substrate 510 including the black matrix 511 and the color filter.

At this time, the black matrix 511 is formed at regions corresponding to gate lines, data lines and thin film transistors formed at the image display portion of the thin film transistor array substrate 510 to prevent a phenomenon that red, green and blue lights transmitted by unit pixels through the color filters are mixed with adjacent pixels to degrade the picture quality of the liquid crystal display panel. As the black matrix 511, a resin or a Cr material may be applied. The Cr material is more advantageous than the resin in that a thin film is formed, a material cost is cheap, and a pattern is precisely formed at a desired position.

The first substrate 410 and the second substrate 510 are attached by the seal pattern 400 so that the pixel electrode 460 and the common electrode 512 face each other. At this time, the black matrix 511 and the common electrode 512 formed on the second substrate 510 are extended to a predetermined distance outwardly of the seal pattern 400, and the black matrix 511 is more extended than the common electrode 512.

Comparatively, referring back to the related art of FIG. 4, the thin film transistor array substrate 210 of the region where the line-on-glass lines 211 are formed, the pixel electrode 260 is extended outwardly of the seal pattern 270 overlapping with the line-on-glass lines 211 so that it faces the black matrix 311 and the common electrode 312 which are extended outwardly of the seal pattern 270. If the passivation film 240 is excessively etched, the pixel electrode 260 electrically contacts the line-on-glass lines 211 in the bonding holes 250, and also, the common electrode 312 and the black matrix 311 made of Cr contact electrically each other. Then, because an electrical signal transmitted through the line-on-glass lines 211 is applied to the pixel electrode 260 and a common voltage applied to the common electrode 312 is applied to the black matrix 311, if moisture or contamination infiltrates between the pixel electrode 260 and the black matrix 311, electrolytic corrosion occurs there.

However, in the present invention, as described above, though the pixel electrode 460 is patterned to overlap with the line-on-glass lines 411 but not to protruded from the seal pattern 400 (that is, it is patterned within the seal pattern 400). The seal pattern 400 prevents infiltration of moisture or a contaminant from outside. Thus, even though the first substrate 410 and the second substrate 510 are attached by the seal pattern 400 so that the pixel electrode 460 of the first substrate 410 and the common electrode 512 of the second substrate 510 face each other. Because the pixel electrode 460 is not formed at the outer side of the seal pattern 400, the electrolytic corrosion as in the related art does not occur.

Meanwhile, unlike the case shown in FIG. 6, if the common electrode 512 formed on the second substrate 510 is patterned not to be protruded from the seal pattern 400, electrolytic corrosion can be also prevented. In addition, if both the pixel electrode 460 and the common electrode 512 are patterned not to be protruded from the seal pattern 400, the electrolytic corrosion can be also prevented.

As so far described, the liquid crystal display panel and its fabrication method of the present invention have the following advantages. That is, the pixel electrode is formed overlapping with the line-on-glass lines mounted at the corner portion of the thin film transistor array substrate but not protruded from the seal pattern which attaches the thin film transistor array substrate and the color filter substrate. Accordingly, such an electrolytic corrosion as in the related art, in which moisture or contamination infiltrates between the pixel electrode formed extended outwardly of the seal pattern on the thin film transistor array substrate and the black matrix extended outwardly of the seal pattern on the color filter substrate, can be prevented. In addition, because the electrolytic corrosion between the pixel electrode and the black matrix is prevented, light leakage caused at the image display portion of the liquid crystal display panel as the electrolytic corrosion of the black matrix proceeds to the image display portion can be accordingly prevented, thereby enhancing a picture quality. Moreover, because ionization of the Cr component of the black matrix caused due to the electrolytic corrosion which occurs a current flow is prevented, shorting between the pixel electrode of the thin film transistor array substrate and the black matrix of the color filter substrate is prevented at the region where the line-on-glass lines are formed, according to which short between the line-on-glass lines being in contact electrically with the pixel electrode and the common electrode being in electrical contact with the black matrix can be also prevented. Therefore, a deficiency of driving of the liquid crystal display panel can be prevented.

It will be apparent to those skilled in the art that various modifications and variations can be made in the liquid crystal display panel and fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a first substrate having an image display portion thereon;
   a second substrate; and
   a seal pattern disposed along an outer periphery of the image display portion to attach the first substrate with the second substrate,
   wherein the first substrate includes:
   at least one conductive line disposed at a corner portion of the first substrate,
   a multi-layer film disposed on the first substrate and the at least one conductive line, the multi-layer film defining a plurality of bonding holes disposed along a region where the seal pattern is disposed, and
   a transparent electrode formed on the multi-layer film and in the bonding holes such that the transparent electrode is entirely disposed within a boundary defined by an outer side of the seal pattern, at least one of the bonding holes being substantially completely filled by the transparent electrode and the seal pattern.

2. The liquid crystal display panel according to claim 1, wherein the first substrate and the second substrate are attached such that one shorter side and one longer side of the first substrate protrude from a boundary defined by the second substrate.

3. The liquid crystal display panel according to claim 2, wherein a gate pad portion is disposed at the protruded shorter side of the first substrate and a data pad portion is disposed at the protruded longer side of the first substrate.

4. The liquid crystal display panel according to claim 2, wherein the at least one conductive line includes at least one line-on-glass line disposed at a corner portion of the first substrate where the shorter side and the longer side meet.

5. The liquid crystal display panel according to claim 1, wherein the at least one conductive line transmits DC signals including a gate high voltage (Vgh), a gate low voltage (Vgl), a common voltage (Vcom), a ground voltage (GND) and a power supply voltage (Vcc), and AC signals including a gate start pulse (GSP), a gate shift clock (GSC) and a gate enable signal (GOE).

6. The liquid crystal display panel according to claim 1, wherein the multi-layer film includes a gate insulation film, a semiconductor layer, and a passivation film.

7. The liquid crystal display panel according to claim 6, wherein the passivation film includes at least one of a benzocyclobutene (BCB), a spin-on-glass (SOG), and a photo-acryl.

8. The liquid crystal display panel according to claim 1, wherein the second substrate includes:
    a black matrix defining outer edges of pixels of the image display portion;
    a color filter disposed corresponding to the unit pixel of the image display portion; and
    a common electrode disposed at the upper surface of the second substrate having the black matrix and the color filter.

9. The liquid crystal display panel according to claim 8, wherein the common electrode is disposed within the image display portion and covered by the seal pattern.

10. The liquid crystal display panel according to claim 1, wherein the bonding holes are disposed over the at least one conductive line.

11. A method for fabricating liquid crystal display panel, comprising the steps of:
    preparing a first substrate as a thin film transistor substrate, the first substrate including a multi-layer film on the first substrate and the at least one conductive line with the multi-layer film defining a plurality of bonding holes;
    preparing a second substrate as a color filter substrate;
    forming at least one transparent electrode on at least one of the first substrate and the second substrate; and
    forming a seal pattern to attach the first substrate with the second substrate,
    wherein the transparent electrode is entirely disposed within a boundary defined by an outer side of the seal pattern, and wherein at least one of the bonding holes are substantially completely filled by the transparent electrode and the seal pattern.

12. The method according to claim 11, wherein the first substrate and the second substrate are attached such that one shorter side and one longer side of the first substrate protrude from a boundary defined by the second substrate.

13. The method according to claim 12, wherein a gate pad portion is disposed at the protruded shorter side of the first substrate and a data pad portion is disposed at the protruded longer side of the first substrate.

14. The method according to claim 12, wherein the at least one conductive line includes at least one line-on-glass line disposed at a corner portion of the first substrate where the shorter side and the longer side meet.

15. The method according to claim 11, wherein the at least one conductive line transmits DC signals including a gate high voltage (Vgh), a gate low voltage (Vgl), a common voltage (Vcom), a ground voltage (GND) and a power supply voltage (Vcc), and AC signals including a gate start pulse (GSP), a gate shift clock (GSC) and a gate enable signal (GOE).

16. The method according to claim 11, wherein the multi-layer film includes a gate insulation film, a semiconductor layer, and a passivation film.

17. The method according to claim 16, wherein the passivation film includes at least one of a benzocyclobutene (BCB), a spin-on-glass (SOG), and a photo-acryl.

18. The method according to claim 11, wherein the second substrate includes:
    a black matrix defining outer edges of pixels of an image display portion;
    a color filter disposed corresponding to the unit pixel of the image display portion; and
    a common electrode disposed at a surface of the second substrate having the black matrix and the color filter.

19. The method according to claim 18, wherein the common electrode is disposed within the image display portion and covered by the seal pattern.

20. A liquid crystal display panel, comprising:
    a first substrate;
    a second substrate;
    a seal pattern disposed along an outer edge of an image display portion of the first substrate and the second substrate, and attaching the first and second substrates;
    at least one line-on-glass line disposed at a corner portion of the first substrate;
    a multi-layer film disposed on the first substrate with the line-on-glass line formed thereon and having a plurality of bonding holes disposed regularly along the region where the seal pattern passes; and
    a transparent electrode disposed on the multi-layer film having a plurality of the bonding holes overlapping the at least one line-on-glass line and patterned not to be protruded from the seal pattern, at least one of the bonding holes being substantially completely filled by the transparent electrode and the seal pattern.

21. A liquid crystal display panel, comprising:
    a first substrate having an image display portion thereon;
    a second substrate; and
    a seal pattern disposed along an outer periphery of the image display portion to attach the first substrate with the second substrate, wherein at least one of the first substrate and the second substrate includes a transparent electrode such that the transparent electrode is entirely disposed within a boundary defined by an outer side of the seal pattern, and wherein at least one of the bonding holes are substantially completely filled by the transparent electrode and the seal pattern.

22. The liquid crystal display panel according to claim 21, wherein the transparent electrode defines a pixel electrode.

23. The liquid crystal display panel according to claim 21, wherein the transparent electrode defines a common electrode.

* * * * *